United States Patent [19]

Hill

[11] Patent Number: 4,621,299
[45] Date of Patent: Nov. 4, 1986

[54] HIGH ENERGY DEGAUSSER

[75] Inventor: James D. Hill, Mount Airy, Md.

[73] Assignee: General Kinetics Inc., Rockville, Md.

[21] Appl. No.: 439,550

[22] Filed: Nov. 5, 1982

[51] Int. Cl.[4] ............................................. H01F 13/00
[52] U.S. Cl. .................................. 361/151; 361/155; 361/156; 361/267
[58] Field of Search ............... 361/151, 149, 267, 155, 361/156

[56] References Cited

U.S. PATENT DOCUMENTS

| | | | |
|---|---|---|---|
| 2,825,854 | 3/1958 | Littwin | 361/149 |
| 3,143,689 | 8/1964 | Hall | 361/151 |
| 3,164,753 | 1/1965 | Schroeder | 361/149 X |
| 3,321,586 | 5/1967 | Krones | 361/151 X |
| 3,638,074 | 1/1972 | Inouye | 361/149 X |
| 3,895,270 | 7/1975 | Maddox | 361/149 |
| 3,938,011 | 2/1976 | Littwin | 361/151 |
| 4,142,221 | 2/1979 | Jenkins et al. | 361/151 |
| 4,346,426 | 8/1982 | Baumann et al. | 361/151 |
| 4,402,032 | 8/1983 | Wilterdink | 361/149 X |
| 4,462,059 | 7/1984 | Yamagami et al. | 361/149 |

FOREIGN PATENT DOCUMENTS

| | | |
|---|---|---|
| 1098626 | 1/1968 | United Kingdom ................ 361/151 |
| 1204023 | 9/1970 | United Kingdom . |
| 1218515 | 1/1971 | United Kingdom . |
| 2069259 | 8/1981 | United Kingdom . |

Primary Examiner—Michael L. Gellner
Attorney, Agent, or Firm—Cushman, Darby & Cushman

[57] ABSTRACT

A magnetic material degausser in which the material to be degaussed is placed within the center of a degaussing coil. A capacitive discharge system is employed for energizing the degaussing coil. The capacitor is repeatedly discharged through the coil in such a way that for at least a portion of the degaussing cycle, the energy applied to the coil decreases with each energization. The magnetic material may be rotated within the coil as the degaussing cycle progresses. In one embodiment of the present invention, the energy discharged from the capacitor first increases and then decreases during the degaussing cycle with each energization of the coil. The rotational speed of the magnetic material within the coil may be related to the frequency at which the capacitor is discharged.

42 Claims, 11 Drawing Figures

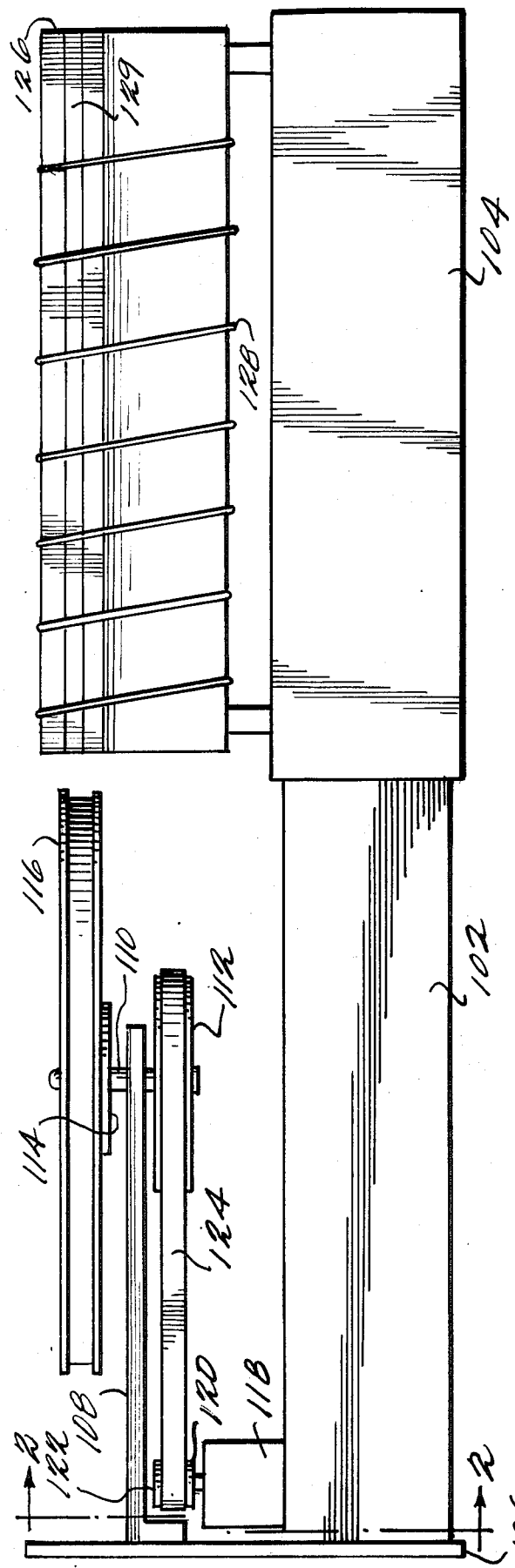
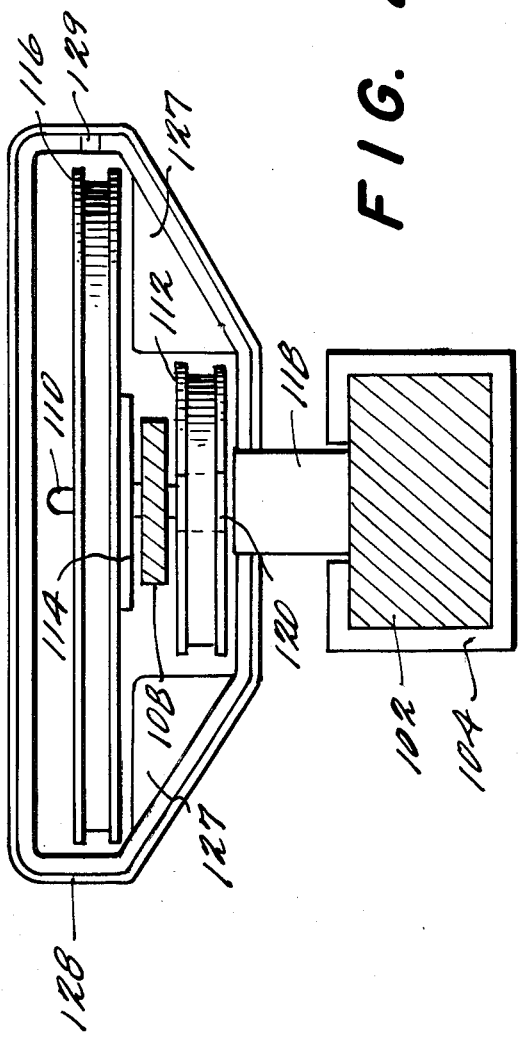

HIGH ENERGY DEGAUSSER

BACKGROUND OF THE INVENTION

1. Field Of The Invention

This invention relates generally to the art of removing permanent magnetization from objects.

2. Description Of The Prior Art

In the art of making reusable magnetic recordings, usually on the magnetizable surface of a magnetic recording tape, it is often desirable to "erase" the originally recorded data so that the magnetic recording tape or other medium can be used properly to make a second data recording in pure and accurate form, independent of the previously recorded data on the medium. In this respect, the term "erasing" must be distinguished from the term "degaussing". Degaussing is a more specific term relating to the returning of a magnetized object, such as a magnetic recording tape or other medium to the totally demagnetized state or an approximation thereof. A system which accomplishes this purpose has become known as a degausser. The term "erasing" is often employed generally to describe the obliterating of previously magnetically recorded data from a recording tape by any technique.

Two commonly employed techniques exist by which magnetically recorded data may be obliterated from a magnetic medium. The first technique, generally automatically used in purely digital, magnetically-saturated "computer" tapes, is simply to apply a strong, saturating, unvarying, uni-directional magnetic field along the recording length and direction of the tape by application of an "erase" magnetic head or permanent magnet. In this technique, the entire recorded length of a magnetic tape may simply be pulled across the active portion of such an "erase" head to accomplish obliteration of the originally recorded varying data. This procedure leaves all portions of the magnetic recording surface fully magnetized to saturation in the same direction, obliterating the previously recorded signal variations that comprise the recorded data. Different data may then be recorded on the tape by creating a magnetic field in the magnetic material forming the tape which is less than at saturation. This technique may be compared to scribbling over written material with a pencil to obliterate the written material and then writing something different with the eraser of the pencil.

The second technique for obliterating the data on a magnetic tape actually accomplishes degaussing. The degaussing technique attempts to completely remove both all previously recorded signals and any extraneous or structurally generated magnetic noise pulses that might remain in the magnetic coating due to residual magnetization of any sort. This degaussing technique and a subsequent writing operation onto the tape can be compared to erasing written material with a pencil eraser and then writing again over this spot. Degaussing includes the act of removing signal data plus any residual magnetic noise. On the other hand, the first technique described above does not necessarily or commonly remove any residual magnetic noise.

Degaussing is accomplished by applying to each portion of the recording medium surface a magnetic field which reverses direction a number of times and gradually decreases in absolute strength over the course of a degaussing cycle. The degaussing magnetic field is reduced gradually at each point of the tape surface from an initial level at least (usually more than) the level of apparent magnetic saturation through many cycles to a level gradually approaching zero. This leaves the magnetic recording surface only very slightly magnetized by the residual effects of the earth's magnetic field and any other residual fields applied by slight occasional magnetization of nearby equipment components.

Degaussing, sometimes called AC erasure, is much more effective than uni-directional saturation, sometimes called DC erasure, particularly with analog recording tapes, since degaussing reduces false, residual background noise to a practical minimum so that a subsequent recording of data will include as little noise as possible.

While simple DC saturation can be performed by running the tape across a fixed magnetic recording head supplied with a saturation strength direct current, degaussing can be accomplished by applying a high frequency peak saturation alternating current to the "erasing" head so that each portion of the magnetic tape experiences many alternating cycles of applied field which decrease gradually in intensity at a given point on the recording surface due to its mechanical withdrawal from the point of maximum magnetic action at the degaussing head active gap.

While degaussing of magnetic tapes by transportation across a degaussing head is highly effective, it is time consuming and not economical in that it requires the use of relatively expensive magnetic tape transportation devices to accomplish the desired purpose.

It is also known that full reels of magnetic tape can be degaussed, without unwinding and rewinding, in a "bulk" degaussing machine which applies the required, gradually-decreased alternating applied magnetic field to the entire tape roll without unwinding the tape.

Regardless of the particular degaussing machine, the end result of degaussing is to make the remanent flux remaining permanently on the recording surfaces as small as possible in order to leave the magnetic recording material in as nearly a totally demagnetized condition as possible. This result can be accomplished only by either raising the temperature of the magnetized recording material to a destructively high level or by causing the material to traverse a very large number of gradually shrinking magnetic hysteresis loops by periodically reversing the polarity of an applied magnetic field which gradually decreases in intensity.

In quality magnetic recording of analog signals, the generally accepted level of recorded signal and residual magnetic noise removal that must be accomplished by magnetic tape degaussing for both operational efficiency and reasonable security against unfriendly deliberate signal recovery is at least 90 db below the originally recorded saturation signal reproducible within a 10 Hz frequency bandwidth.

For special applications, it is sometimes desirable to reduce the residual magnetization of a previously recorded tape by more than 90 db below previous signal saturation.

In order to degauss a tape that had previously been recorded with a saturated signal, it is necessary to apply a magnetizing force equal to at least two and preferably three times the coercive force or coercivity of the magnetic recording material. Most magnetic tapes in high quality use have a coercivity ranging from 150 to 350 oersteds.

In more recent times, new varieties of magnetic recording tape and other magnetic media have been made available to the industry in which the coercivity has been increased substantially above the 350 oersted level. In the new, "high energy" magnetic recording media, the coercivity may approach 800 oersteds. It is not inconceivable that additional improvement in magnetic recording media will provide tapes with even higher coercivity values.

The appearance of especially high energy recording media requires the provision of degaussing systems capable of applying much higher magnetizing forces than have been practically possible with currently existing commercial degaussing systems, particularly bulk degaussing systems. While this problem is not especially difficult to overcome in tape degaussing systems which pass the entire length of the tape sequentially across a degaussing head, developing the required higher degaussing energy levels in a practical sense becomes more and more difficult when it is desired to use the more economical method of bulk degaussing described above.

The currently available best quality commercial bulk degaussing systems for magnetic tapes, such as, for example, the K-90 tape degausser manufactured by General Kinetics Incorporated, Rockville, Md., universally employ alternating current electromagnets to apply the required degaussing field from outside of the reel of tape or other package of magnetic medium to be degaussed. In order to achieve even the modest external field strengths required for ordinary, comparatively low energy magnetic tape, these degaussers use coils of heavy wire surrounding laminated transformer iron cores. These coil-core combinations generally are powered by continuous application of alternating current from a normal 60 or 50 Hz supply line. The useful portion of the magnetic field produced by iron cored coils of this type occurs in an air gap interrupting the iron core structure to allow insertion of the reel of magnetic tape. The reel of tape usually is inserted fully into the active air gap of such systems and either is caused to rotate while being slowly withdrawn geometrically from the field influence or is rotated at a fixed position in the air gap while the applied alternating electric field is gradually reduced. Either of these methods results in application through the sides of the tape roll of a gradually reducing applied alternating magnetic field required for degaussing.

As a result of the electromagnetic inefficiency of the necessary air gap in the coilcore structures thus employed, it has been necessary to apply very heavy continuous alternating electric currents to the coils, with resultant heating of the wire due to its electrical resistance and heating of the core material due to hysteresis energy loss in the iron laminations. In addition, it is usually necessary to employ large electrical capacitors connected in parallel with the bulk degausser coils to minimize the total amount of power line current required by providing a degree of power factor correction.

In a great many practical instances, the magnetic tapes to be bulk degaussed will be contained on reels provided with protective metal flanges. Since the externally applied magnetic field emanating from the iron core external coils must penetrate the metal flanges, eddy currents are induced in the flanges which cause them to react mechanically, producing noise, and occasionally vibrating sufficiently to damage the edges of the wound roll of tape. Due to eddy current losses, the metal reel flanges also become heated, with possible damaging results to the tape thereon.

This problem has been overcome by employing a coil of wire containing no iron core. The coil is essentially rectangular in cross section and is used with a reel of tape inserted at least partially within the confines of the inside of the coil with the axis of the coil lying parallel to the real flanges. Such a degaussing system is illustrated in U.S. Pat. No. 3,143,689 to Hall. In this patent, a storage capacitor is gradually charged from the rectified line current. The storage capacitor is periodically discharged through the degaussing coils in synchronism with the frequency of the line current. A second capacitor is connected in parallel with the degaussing coil to create a resonant circuit which rings after the energy in the storage capacitor has been applied to it. This creates a reversing magnetic field which gradually decreases in intensity in accordance with the time constant of the degaussing coil and the second capacitor. According to this patent, the storage capacitor should be discharged six or seven times to produce a sufficient erasure of the magnetic recording tape.

U.S. Pat. Nos. 3,321,586, 2,962,560, and 2,838,720 also teach degaussing systems which employ capacitor discharge circuitry.

As described above, the Hall patent relies upon the characteristics of a resonant circuit to control the frequency of the reversal of the magnetic field and the time period of the decay of the magnetic field. However, the characteristics of the resonant circuit are greatly affected by the nature of the magnetic material inserted within the coil. Thus, reels of different size, reels of the same size with different amounts of tape thereon, or reels of different material influence not only the frequency of field reversals, but also the time constant of the field decay.

Furthermore, in general, in view of the losses associated with the repeated generation of a magnetic field within the tape and surrounding air, it is impractical to extend the time constant of the resonant circuit to an extent sufficient to perform a complete degaussing. It is for this reason that Hall teaches that four or five repetitions are necessary to completely erase the tape.

The Hall patent also teaches the use of two orthogonally arranged sets of degaussing coils. Such an arrangement is necessary to uniformly erase all portions of the tape. This complicates not only the circuitry necessary to energize the coils, but also makes more difficult the problem of placing the tape within the orthogonal sets of coils.

SUMMARY OF THE INVENTION

The present invention overcomes these problems. The bulk degaussing system of the present invention employs a coil of wire having a substantially rectangular cross section in which the reel of tape is inserted. A capacitor is charged gradually and repeatedly discharged through the coil.

A second capacitor is provided across which a control voltage develops. In fact, the charge across the second capacitor gradually decreases for at least a portion of the degaussing cycle. The voltage across the second capacitor is compared with the voltage across the storage capacitor. When the storage capacitor has charged to a level related to the control voltage, a switch is triggered causing the storage capacitor to discharge through the coil. Since the control voltage gradually decreases, the peak amount of energy that is stored in the storage capacitor prior to each discharging gradually decreases so that the strength of the magnetic field applied to the tape gradually decreases.

At the same time, the tape is rotated to effectively reverse the field direction and ensure uniform degaussing. In fact, as the field applied to the tape decreases, the frequency of rotation increases to quicken the degaussing process.

With some tapes, particularly relatively new tapes which have only been recorded on twice and are being erased for the second time, it has been found that starting a degaussing cycle at a lower field strength and then decreasing the field strength produces better results than starting at a higher field strength and then decreasing the field strength. After a tape has been erased more than two or three times, this phenomena disappears and the quality of erasing increases with an increase in the field strength applied to the tape. Since the number of times that a tape has previously been erased cannot always be determined, it has been discovered that if the applied magnetic field begins at an intermediate level, rises to a peak, and then decreases to zero, all tapes will be demagnetized efficiently.

Finally, in order to concentrate the magnetic field in the tape, electrically conductive, non-magnetic blocks, e.g., made of aluminum, may be inserted in the coil around the tape.

BRIEF DESCRIPTION OF THE DRAWING

These and other objects and advantages of the present invention will become apparent and more readily appreciated from the following detailed description of the presently preferred exemplary embodiments of the present invention taken in conjunction with the accompanying drawing, of which:

FIG. 1 is a side elevation view of one embodiment of the mechanical features of the present invention;

FIG. 2 is a sectional view of the present invention taken along the 2—2 line in FIG. 1;

DETAILED DESCRIPTION OF THE PRESENTLY PREFERRED EMBODIMENTS

Figure 3:
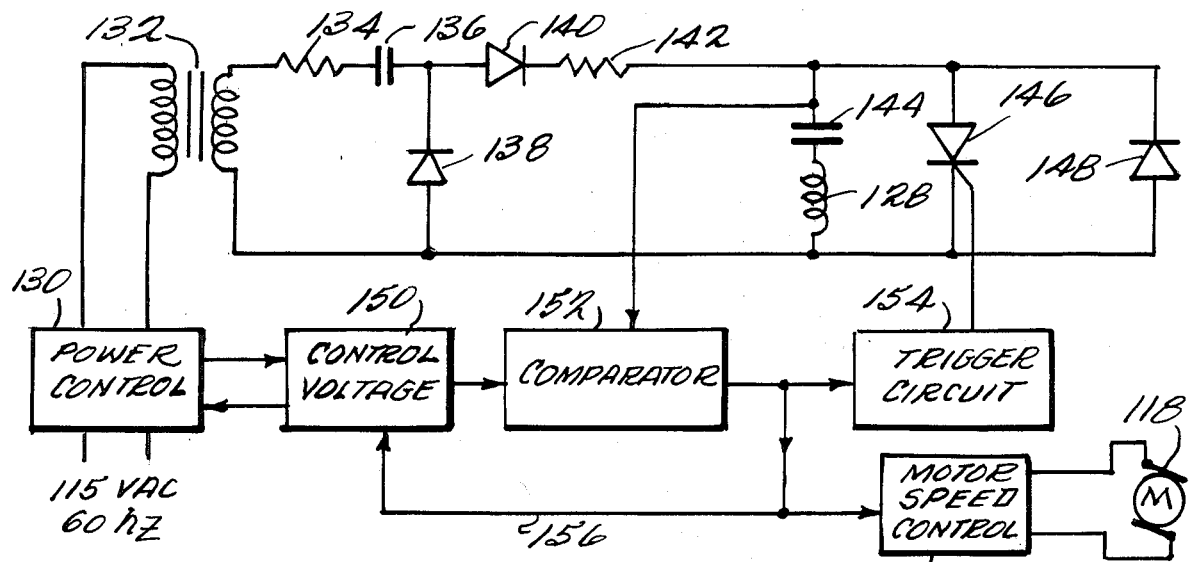
FIG. 3 is a block circuit diagram of one embodiment of the electrical features of the present invention.

FIGS. 1 and 2 illustrate the mechanical arrangement of the present invention. Drawer 100 includes movable slide portion 102 which slides with respect to and is supported by fixed slide portion 104. Attached to movable slide portion 102 is drawer front 106 to which bracket 108 is attached. Pivotably mounted through bracket 108 is shaft 110. Fixed to shaft 110 for rotation therewith are pulley 112 and reel platform 114. Tape reel 116 may be placed on reel support 114 through shaft 110.

Mounted on door 100 is motor 118. Pulley 120 is attached to shaft 122 of motor 118 for rotation with shaft 122. Drive belt 124 operatively interconnects pulley 120 and pulley 112. Thus, when motor 118 operates, tape reel 116 turns.

Housing 126 is mounted fixed with respect to fixed slide portion 104. Preferably, housing 126 is made up of an electrically conductive, nonferromagnetic material such as aluminum. As best illustrated in FIG. 2, housing 126 is hollow, having a generally rectangular cross-section and open ends. Thus, housing 126 conforms quite closely to the outer contours of tape 116 except for that portion of housing 126 which must receive bracket 108, shaft 110 and pulley 112. As a result, the bottom portion of housing 126 slopes downwardly. Those portions 127 of housing 126 between the bottom surface, the rectangular region in which reel tape 116 may be inserted and the rectangular region in which pulley 112 and bracket 108 may be inserted is filled with the electrically conducting, nonferromagnetic material of which the housing is made.

Housing 126 is arranged such that when drawer 100 is closed, reel 116, shaft 110, pulley 112 and a portion of bracket 108 move within housing 126.

Wrapped around housing 126 is coil 128. In the preferred embodiment, coil 128 is made of insulated ten gauge copper wire. Coil 128 extends along the length of housing 126 over the region occupied by tape reel 116 when drawer 100 is pushed in to its furthest extent Since housing 126 is conductive, the field generated by coil 128 will induce eddy currents therein. To prevent the eddy currents from counteracting the current in coil 128, housing 126 is broken along its length and insulator 129 is inserted.

FIG. 3 illustrates the circuit associated with the degausser illustrated in FIGS. 1 and 2. Line voltage is applied to power controller 130, which, in turn, is electrically connected to high voltage transformer 132. The secondary of transformer 132 is connected to a voltage doubler including resistor 134, capacitor 136, diode 138, diode 140 and resistor 142. Resistors 134 and 142 and capacitor 136 are employed to limit the current drawn from the secondary coil of transformer 132.

Resistor 142 is also connected to one terminal of main storage capacitor 144. The other terminal of capacitor 144 is connected to a terminal of coil 128. The other terminal of coil 128 is connected to the secondary coil of transformer 132.

Connected in parallel across capacitor 144 and coil 128 is electronic switch 146, which in the preferred embodiment, is a silicon controlled rectifier (SCR). Connected in parallel with SCR 146 is diode 148. Diode 148 is inserted with such a polarity that current flows through diode 148 in a direction opposite to the direction of most of the current flowing through SCR 146.

When power controller 130 receives the line voltage, it provides a signal to control voltage generator 150 which generates a voltage level which starts high and gradually decreases over a degaussing cycle. When the control voltage reaches a predetermined low level, the degaussing cycle is over and control voltage generator 150 generates a signal to cause power controller 130 to deenergize the circuit.

Control voltage generator 150 provides its control voltage as one input to comparator 152. Comparator 152 compares the control voltage with the voltage across the main storage capacitor 144. When capacitor 144 has been charged to a particular level determined by the control voltage, comparator 152 generates a signal for trigger circuit 154 which causes SCR 146 to become conductive, discharging capacitor 144 through coil 128.

Every time comparator 152 produces a favorable comparison, a signal is fed back from the output of comparator 152 on line 156 to cause control voltage generator 150 to decrease the control voltage by a predetermined amount. In the preferred embodiment, the control voltage is decreased by a fixed percentage.

The output of comparator 152 is also applied to motor speed controller 158. Motor speed controller 158 controls the operation of motor 118.

In operation, power is applied to power controller 130. This immediately causes control voltage generator 150 to generate a high control voltage. Then, when a cycle start switch is closed, power controller 130 applies power to transformer 132. This power is transformed by transformer 132 into a higher voltage and is employed to charge capacitor 144. Eventually, the charge on capacitor 144 becomes sufficiently great to cause comparator 152 to produce a favorable comparison. As a result, trigger circuit 154 triggers SCR 146 to cause current to flow from capacitor 144 through SCR 146 and coil 128. This causes a field to be produced in housing 126. Eventually, the charge in capacitor 144 will become depleted. At this point, the energy stored in coil 128 will cause capacitor 144 to become charged with an opposite polarity.

Figure 4:
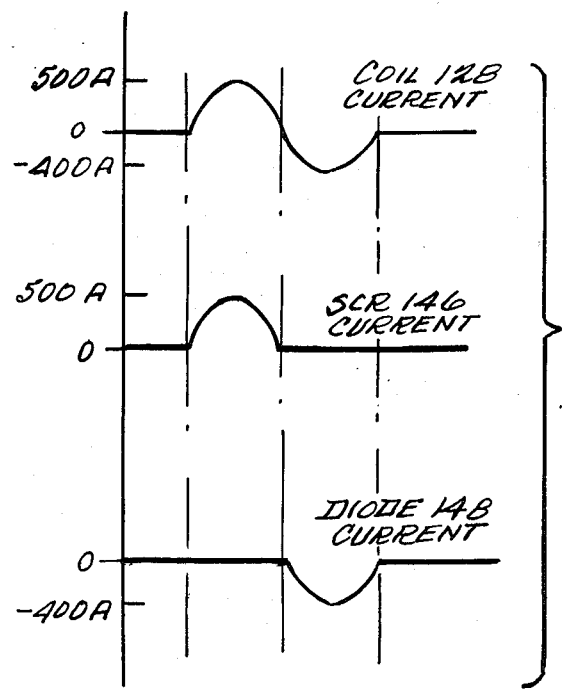
FIGS. 4 and 5 are graphs illustrating the operation of the circuit in FIG. 3.
Figure 5:
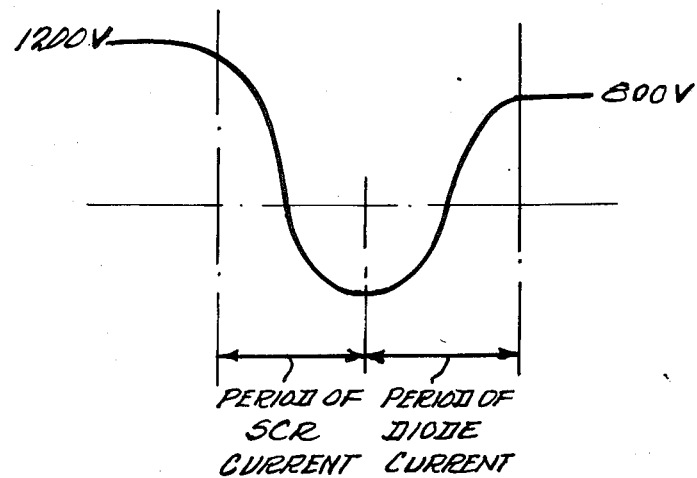

Thus, as illustrated in FIG. 4, as SCR 146 begins to conduct, current through both SCR 146 and coil 128 increases until the energy stored in capacitor 144 has been dissipated. FIG. 5 illustrates the voltage across capacitor 144. Note that it begins at a relatively high level and decreases to zero. Then, the energy stored in coil 128 causes the current to continue to flow in the same direction through capacitor 144 and SCR 146, although in a diminishing amount. This causes a voltage to develop a cross capacitor 144 of reverse polarity as illustrated in FIG. 5. At some point, the current through coil 128 and SCR 146 reaches zero. At this time, SCR 146 stops conducting. However, a voltage across capacitor 144 exists having a polarity opposite to the polarity of the voltage across capacitor 144 just prior to triggering. This voltage causes a current flow through coil 128 and diode 148. As can be seen in FIG. 4, this current gradually increases and then decreases. As illustrated in FIG. 5, at some point, the energy stored in capacitor 144 reaches zero. Nevertheless, current continues to flow through coil 128 and diode 148 as a result of the energy stored in coil 128. This causes a voltage to develop across capacitor 144 having a polarity similar to the polarity of the voltage across capacitor 144 just prior to triggering. Eventually, all of the energy stored in coil 128 is exhausted, and the current flow stops. Current flowing through resistor 142 then gradually continues to increase the charge across capacitor 144 until it reaches a level comparable to the control voltage so that trigger circuit 154 causes SCR 146 to become conductive again.

Signals produced by comparator 152 are fed back on line 156 to control voltage generator 150. In the preferred embodiment, this causes the control voltage to decrease by a fixed percentage.

During the degaussing cycle, motor speed controller 158 causes motor 118 to turn reel 116. As a result of this mechanical turning, all portions of the tape experience magnetic fields of reversing polarity so that degaussing can occur. When current is flowing through diode 148, a magnetic field of opposite polarity is generated. However, the strength of this field is generally not sufficient as compared to the strength of the field created when current flows through SCR 146 to effectively accomplish degaussing. Therefore, the rotation of reel 116 improves the quality of degaussing and its uniformity.

As the control voltage decreases, it obviously takes less and less time to charge capacitor 144 to a level comparable with the control signal. Therefore, SCR 146 becomes triggered more and more frequently. Therefore, in order to approximately maintain the same number of SCR 146 triggerings per rotation of tape reel 116, it is necessary to cause tape reel 116 to turn more rapidly. Accordingly, the signals from comparator 152 are applied to motor speed control 158 so that the speed of motor 118 increases as the frequency of the signals from comparator 152 increases.

Figure 6:
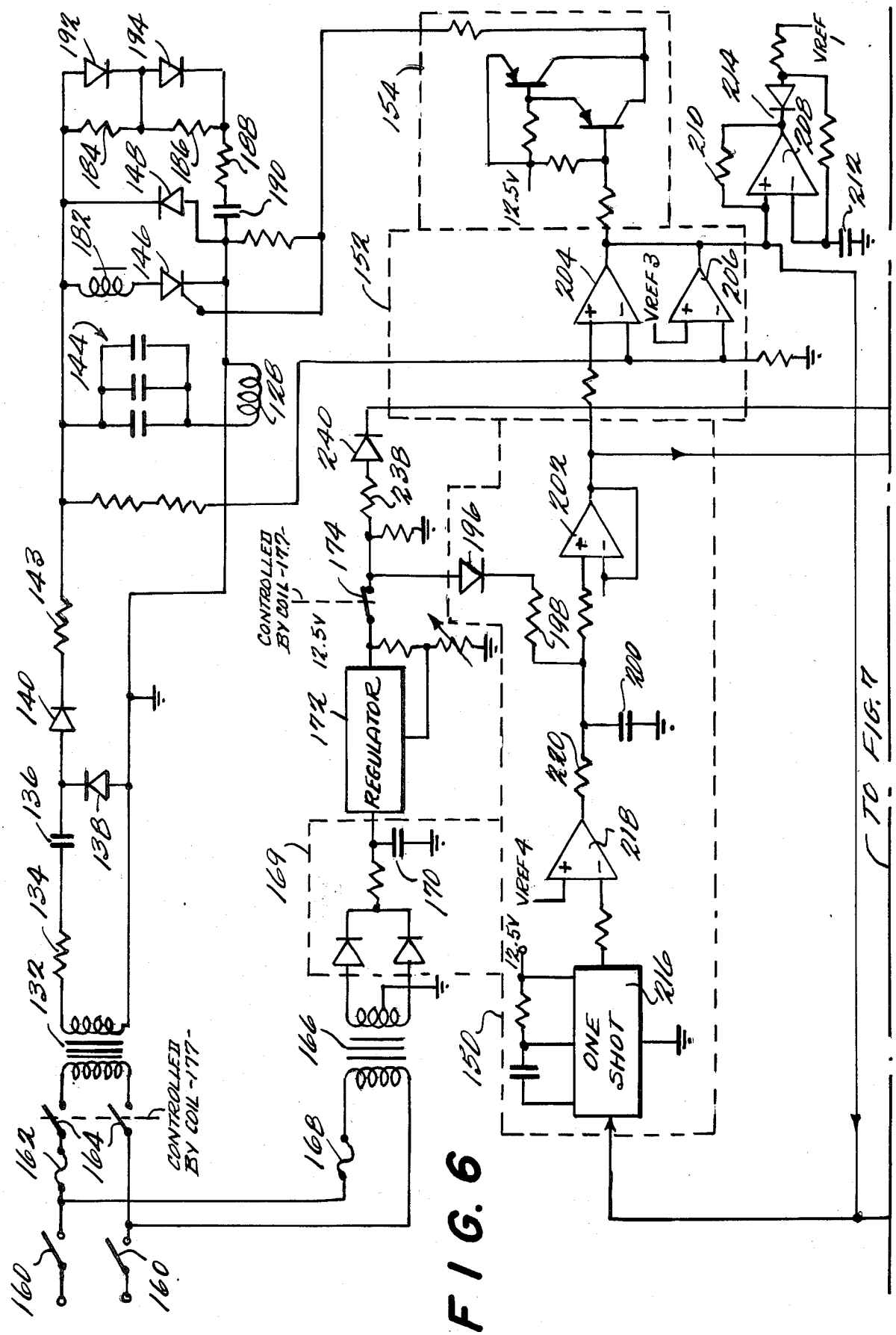
FIGS. 6 and 7 represent a detailed circuit diagram of the embodiment of the present invention illustrated in FIG. 3.
Figure 7:
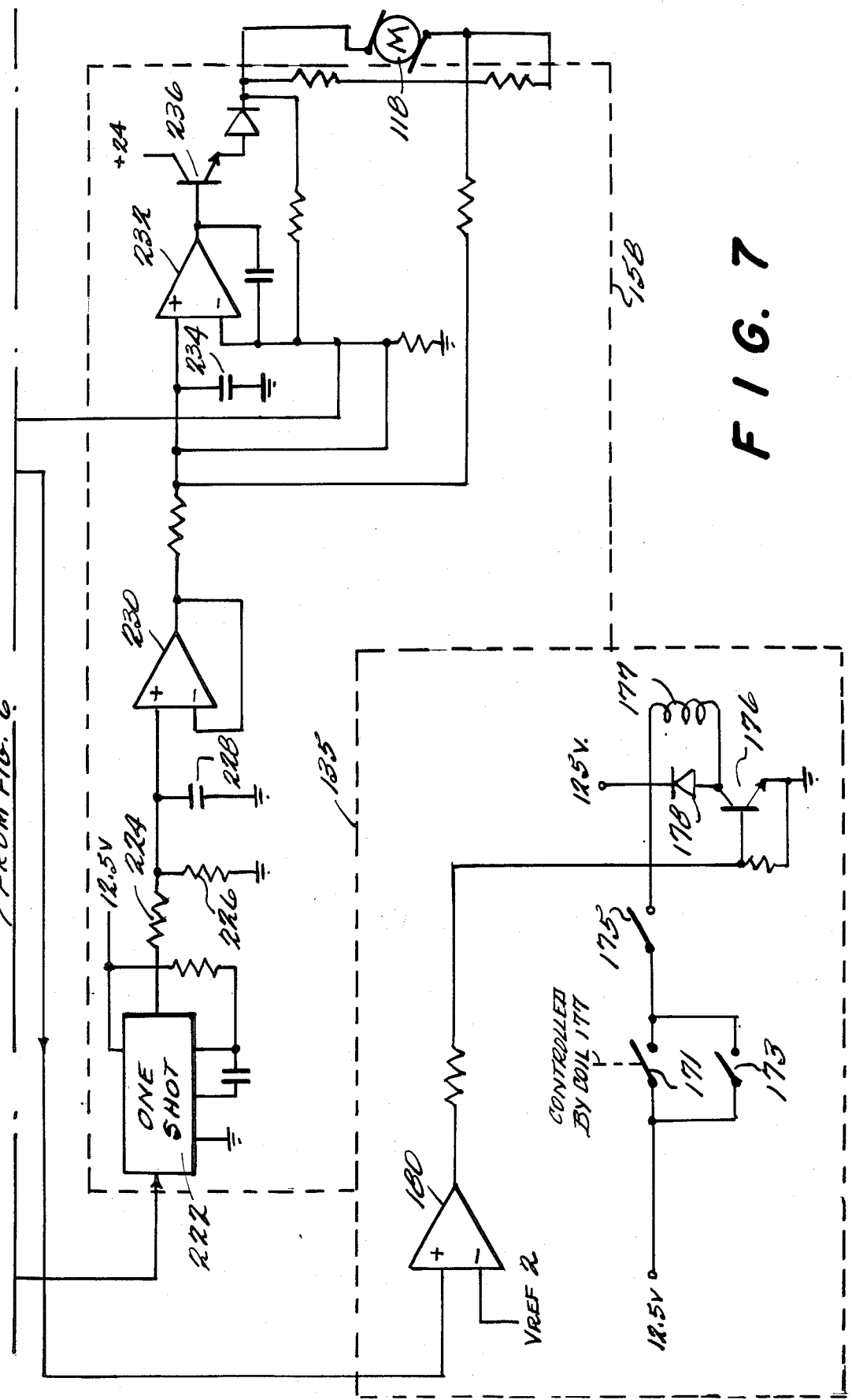

FIGS. 6 and 7 are a detailed circuit diagram of an embodiment of the present invention similar to that described above with respect to FIG. 3 with some additional features. In FIGURE 6, line power is applied to high voltage transformer 132 through main switches 160, fuse 162 and relay contacts 164. Power is also directed to low voltage transformer 166 through fuse 168. The secondary coil transformer 166 is connected to rectifier 169, including capacitor 170 which provides some smoothing AC waveform. The output of rectifier 169 is provided to regulator 172 which produces a constant 12.5 volts. This voltage is applied to contact 171 of power controller 135. Connected in parallel with relay contact 166 is pushbutton start switch 173. Relay contact 171 and pushbutton start switch 173 are connected to interlock switch 175 which closes only when drawer 100 is closed. The other terminal of interlock switch 175 is connected to coil 177 of a relay. It is coil 177 that operates contacts 164, 171 and 174. Contacts 164 and 171 are normally opened and close when coil 177 is energized, while contact 174 is normally closed and is opened when coil 177 is energized. Transistor 176 controls the current flowing through coil 177. Diode 178 is provided to shunt any voltage spikes produced by coil 177 to the 12.5 volt source when transistor 176 shuts off. The conductance of transistor 176 is controlled by operational amplifier 180 which has an inverting input supplied with a reference voltage $V_{REF2}$ and a noninverting input supplied with the control voltage from control voltage generator 150.

Connected to high voltage transformer 132 are resistors 134 and 142, capacitors 136 and 144, diodes 138, 140 and 148 and SCR 146. The only difference between FIG. 3 and FIG. 6 is that in FIG. 6, main storage capacitor 144 is actually made up of three capacitors connected in parallel in order to increase the amount of energy that may be stored therein at a given voltage. Connected in series with SCR 146 is inductor 182. When SCR 146 begins to conduct, inductor 182 slows the rate at which current begins to flow through SCR 146, thus reducing the possibility of destroying SCR 146. Connected in parallel with SCR 146 is a network consisting of resistors 184, 186 and 188, capacitor 190 and diodes 192 and 194. This network slows the rate at which the voltage across SCR 146 increases when SCR 146 turns off. Again, this network helps prevent erroneous triggering of and possible damage to SCR 146.

Control voltage generator 150 includes diode 196 and resistor 198. Connected between resistor 198 and ground is control voltage capacitor 200. Before coil 177 is energized, contact 174 is closed, causing current to flow from regulator 172 through diode 196 and resistor 198 to charge control voltage capacitor 200 to a high level. The voltage on capacitor 200 passes through buffer 202 to comparator 204 of comparator circuit 152. The voltage level on main storage capacitor 144 is applied to the inverting input of comparator 204. The output of comparator 204 can have one of two states. When the difference between the value of the input signals on its noninverting and inverting inputs is positive, the output of comparator 204 floats. When the difference is negative, the output of comparator 204 is connected to ground.

Also included in comparator circuit 152 is comparator 206. The noninverting input of comparator 206 is supplied with a reference voltage $V_{REF3}$. The inverting input of comparator 206 is also connected to main storage capacitor 144. Comparator 206 operates in the same manner as comparator 204 in that its output either floats or is grounded.

Trigger circuit 154 receives the output of comparators 204 and 206. Trigger circuit 154 generates a signal to turn on SCR 146 in response to a low signal from either comparator 204 or comparator 206.

Operational amplifier 208 acts as a monostable multivibrator. When the output of either comparator 204 or 206 becomes low, it causes the output of operational amplifier 208 to become low. This low signal is fed back through resistor 210 to hold the input to trigger circuit 154 low independent of comparators 204 and 206. Since the output of operational amplifier 208 is low, capacitor 212 slowly discharges through diode 214. Eventually, the inverting input of operational amplifier 208 becomes lower than the noninverting input so that the output of operational amplifier 208 floats.

The output of comparator circuit 152 is provided to an input of monostable multivibrator or one shot 216 of control voltage generator 150. The output of one shot 216 is normally low, but becomes high for a fixed period of time in response to an input signal. The output of one shot 216 is provided to the inverting input of operational amplifier 218. The noninverting input of operational amplifier 218 is supplied with a reference voltage $V_{REF4}$ which is between the high and low levels outputted by one shot 216. Operational amplifier 218 is similar to comparators 204 and 206 in that its output either floats or is connected to ground. Normally, the output of one shot 216 is less than reference voltage $V_{REF4}$ so that the output of operational amplifier 218 floats. Therefore, control voltage capacitor 200 is not discharged. However, when a signal is applied to the input of one shot 216, its output becomes higher than reference voltage $V_{REF4}$. As a result, the output of operational amplifier 218 is grounded so that capacitor 200 discharges through resistor 220. Thus, the control voltage applied to comparator 204 decreases.

Motor control circuit 158 is also responsive to the output of comparator circuit 152 in that the output is applied to monostable multivibrator or one shot 222. The output of one shot 222 is integrated by means of resistors 224 and 226 and capacitor 228. The output of this integrator is applied to buffer 230 whose output is applied to differential amplifier 232. Capacitor 234 provides further smoothing of the signal. The output of differential amplifier 232 is applied to transistor 236 which drives motor 118.

Resistor 238 and diode 240 connect a terminal of contacts 274 with the inverting input of operational amplifier 232.

In operation, main power switches 160 are closed, causing regulator 172 to produce 12.5 volts. Since relay coil 177 is deenergized, contacts 174 are closed so that the 12.5 volts from regulator 172 passes through diode 196 and resistor 198 to charge control voltage capacitor 200. The energy which passes through contacts 174 also passes through resistor 238 and diode 240 to be applied to the inverting input of operational amplifier 232 to insure that motor 118 remains off.

Then, a reel of tape is placed on spindle 110 and drawer 100 is closed, closing interlock switch 175. Start switch 173 may then be pressed which provides a voltage at one terminal of relay coil 177. The voltage that has charged capacitor 200 passes through buffer 220 and is applied to operational amplifier 180 to cause its output to become high so that transistor 176 is energized. As a result current flows through relay coil 177, closing contacts 164 and 171 and opening contacts 174. As a result, capacitors 144 begin to charge. At the same time, the closing of contacts 171 guarantees that current will continue to flow through relay coil 177.

Eventually, sufficient energy has been stored in capacitors 144 so that the voltage on the inverting input of comparator 206 is greater than $V_{REF3}$. As a result, the output of comparator 206 becomes low, triggering SCR 146. The output of comparator 206 is also fed back to one shot 216 which produces a timed pulse which causes the voltage across capacitor 200 to decrease by a fixed percentage. At the same time, the output of comparator 206 also triggers one shot 222 to produce a signal which places a small charge on capacitor 228. As a result, motor 118 begins to turn slowly.

After SCR 146 and diode 148 stop conducting, energy from transformer 132 again begins to charge capacitors 144. Eventually, this causes a favorable comparison in comparator 206, triggering SCR 146 again. This process continues, and as it does, the control voltage across capacitor 200 gradually reduces and the charge on capacitor 228 gradually increases so that the motor increases in speed.

Eventually, the charge on capacitor 200 becomes sufficiently small so that the voltage applied to the noninverting input of comparator 204 is less than $V_{REF3}$. When this occurs, the next time capacitors 144 are charged to a sufficiently high level, the output of comparator 204 becomes low, triggering SCR 146 and one shots 116 and 222. From this point in the cycle on, each time one shot 216 is triggered, the charge on control voltage capacitor 200 decreases, so that the amount of time necessary to charge capacitors 144 to the appropriate level decreases. At the same time, the triggering of one shot 222 charges capacitor 228 so that the speed of motor 118 increases. Thus, as the cycle continues, the rate of discharging of capacitors 144 increases as the speed of rotation of the reel of tape increases. This is to keep approximately constant the number of discharges per tape revolution.

Eventually, the charge on control voltage capacitor 200 is so low that voltage level $V_{REF2}$ becomes greater than the output of buffer 202. As a result, the output of comparator 180 becomes low, turning off transistor 176. As a result, current stops flowing in coil 177, opening contacts 164 and 171 and closing contact 174. With contacts 174 closed, the voltage applied to the inverting input of operational amplifier 232 insures that motor 118 is no longer driven. This completes one degaussing cycle.

Intuition would lead one to believe that the higher the voltage across capacitors 144 prior to the initial discharging in each degaussing cycle, the better the degaussing will be. In fact, this is generally the rule. However, it has been found that at certain times, when a degaussing cycle is started with a lower energy on capacitors 144, more effective degaussing occurs. It appears that this phenomenon occurs with tapes that have been written on twice and are about to be erased for the second time. As the tapes are erased more than two times, this phenomenon disappears. A problem arises in that new tapes are often mixed in with old tapes so that it is impossible to tell whether a new tape or an old tape is being degaussed. Accordingly, it is desirable to design a circuit which efficiently erases all tapes, no matter how many times they have been written on.

Figure 8:
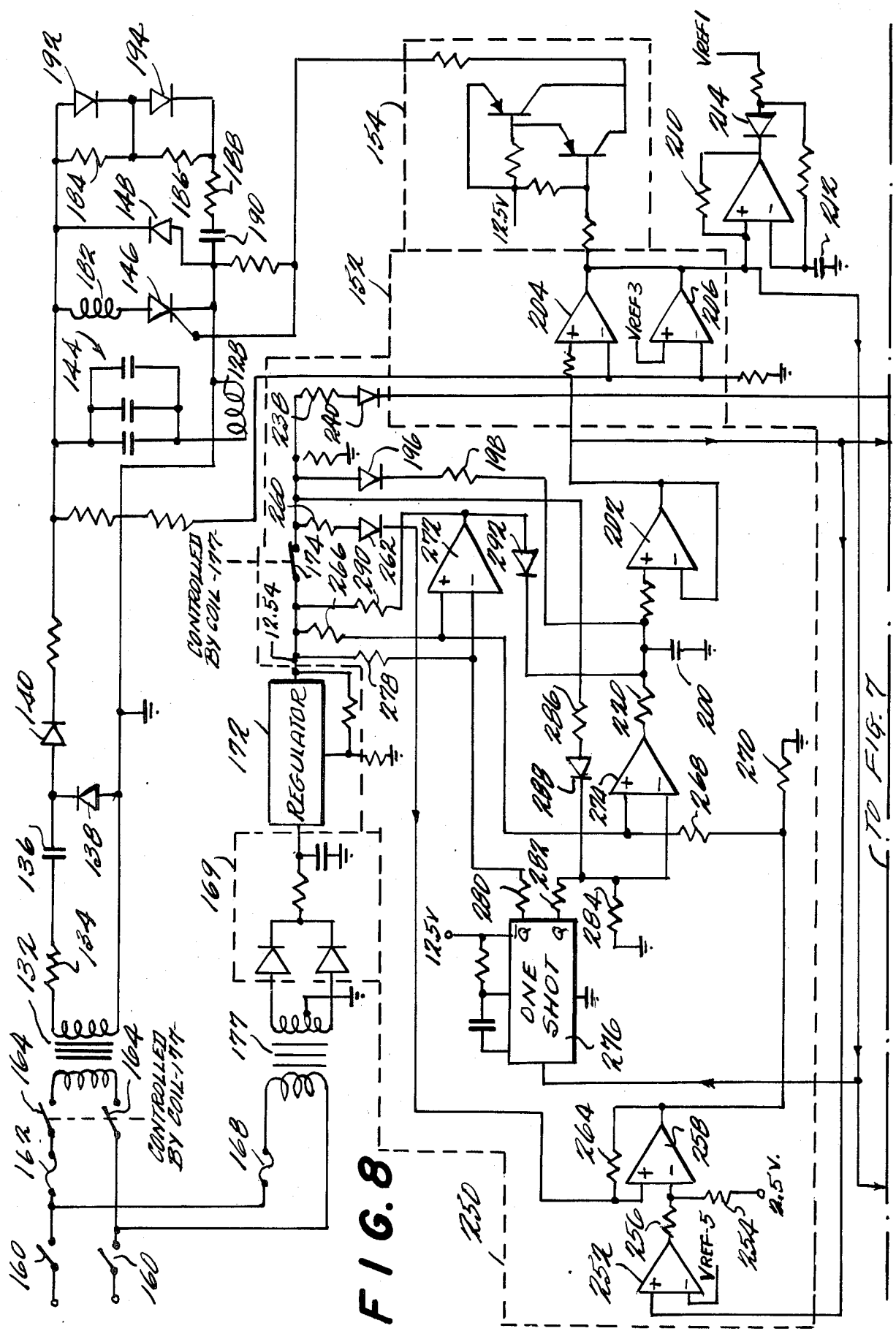
FIG. 8 is a detailed circuit diagram to be used in conjunction with FIG. 6 of a second embodiment of the electrical features of the present invention.

FIG. 8 in conjunction with FIG. 7 illustrate a circuit for accomplishing this efficient erasure. Thus FIG. 7 is employed to illustrate a portion of the circuitry in two embodiments. Instead of beginning degaussing at a high energy plateau which gradually decreases, the circuit in FIGS. 7 and 8 begin degaussing at an intermediate energy level which builds to a plateau and then drops to a very low value. The circuit in FIGS. 7 and 8 is very similar to the circuit in FIGS. 6 and 7. In fact, the circuits are identical except for the control voltage circuit. Accordingly, similar elements are designated similarly and will not be described in detail again, except for the manner in which they interreact with the new control voltage generator.

In FIG. 8, control voltage generator 250 includes comparator 252 which has a noninverting input connected to the output of buffer 202 (representing the control voltage stored on capacitor 200) and an inverting input connected to a reference voltage value $V_{REF5}$. Comparator 252 is of the type similar to comparators 204 and 206 in that its output either floats or is connected to ground. Resistors 254 and 256 form a voltage divider connected to the output of comparator 252 which provides an input to the inverting terminal of operational amplifier 258. The noninverting input of operational amplifier 258 receives a voltage from contact 174 through resistor 260 and diode 262. Connected between the output of operational amplifier 258 and its noninverting input is resistor 264. Operational amplifier 258 is of the same type as comparator 252 in that its output is either floating or connected to ground.

The values of resistors 254, 256, 260 and 264 are chosen such that operational amplifier 258 operates as a bistable multivibrator or a flip-flop. Initially, the output of flip-flop 258 is high as set by the voltage from contact 274 which passes through resistor 260 and diode 262. Feedback through resistor 264 maintains the output of flip-flop 258 high even after contact 274 is opened. At some point in the operation of the circuitry as will be described in detail below, the output of comparator 252 becomes high so that 12 volts are applied to the inverting input of flip-flop 258. This causes the output of flip-flop 258 to become low, and this low value is fed back through resistor 264 to the noninverting input of flip-flop 258. Since the inverting input of flip-flop 258 cannot go below a certain level determined by resistors 254 and 256, the output of flip-flop 258 remains low until reset by the closing of contact 274.

The output of flip-flop 258 is employed to control the voltages at the nodes of a voltage divider network made up of resistors 266, 268 and 270 connected in series between 12.5 volts in ground. Ramp-up driver 272 and ramp-down driver 274 each have a noninverting input connected between resistors 266 and 268. The inverting inputs of drivers 272 and 274 are respectively connected to the $\overline{Q}$ and Q outputs of monostable multivibrator or one shot 276. In response to an input signal, the Q output of one shot 276 becomes high for a fixed period of time and the $\overline{Q}$ output becomes low for the same time. After that period of time, the Q output becomes low and the $\overline{Q}$ output becomes high. Operational amplifiers 272 and 274 are both of the same type as comparator 252 in that their output either floats or is grounded.

The $\overline{Q}$ output of one shot 276 is connected to ramp-up driver 272 through a voltage divider network including resistors 278 and 280, which in the preferred embodiment, are of equal value. This permits the inverting input of driver 272 to assume the values of either six volts or 12 volts. The Q output of one shot 276 is connected to the inverting input of driver 274 through a voltage divider network including resistors 282 and 284. In the preferred embodiment, resistors 282 and 284 are selected so as to cause the inverting input of driver 274 to assume either a zero volt or a six volts value. Resistors 266, 268 and 270 have values chosen in the preferred embodiment so that the voltage between resistors 266 and 268 can vary with the output of flip-flop 258 between either three volts or nine volts.

Resistor 286 and diode 288 connect a terminal of contacts 174 with the inverting input of operational amplifier 274.

In operation, switches 160 are closed so that regulator 172 produces 12.5 volts. Since, at this point, relay coil 177 is not energized, relay contact 174 is closed and relay contacts 164 and 171 are open. As a result, the 12.5 volts flows through contact 174, resistor 260 and diode 262 to set flip-flop 258 so that its output is high. As long as the output of flip-flop 258 is high, the voltage on capacitor 200 can only ramp upward once start switch 173 is closed. At the same time, 12.5 volts flows through contact 174, resistor 286 and diode 288 to cause the inverting input of ramp-down driver 274 to become high. This results in the output of driver 274 to be connected to ground. The 12.5 volts from contact 274 also passes through diode 296 and 298 through resistor 220 and then to ground within driver 274. This causes a voltage to appear across control voltage capacitor 200 which represents an intermediate value.

Once switch 173, is momentarily closed and the drawer is pushed in, closing switch 175, coil 177 is energized opening contact 174 and closing contacts 164 and 171. Since contact 174 is opened, the inverting input of driver 274 becomes low so that the output of driver 274 floats. Therefore, the intermediate voltage stored on capacitor 200 remains.

At this time, a voltage begins to develop across capacitors 144. When comparator 204 determines that this voltage is greater than the reference voltage across control voltage capacitor 200, comparator 204 causes SCR 146 to fire. The output of comparator 204 also triggers one shot 276 so that its Q output becomes high and its $\overline{Q}$ output becomes low. Since the output of flip-flop 258 is high, the voltage in the preferred embodiment between resistors 266 and 268 is at nine volts. The triggering of one shot 276 causes the inverting input of driver 274 to change from zero volts to six volts so that the output of driver 274 does not change. On the other hand, the $\overline{Q}$ output of one shot 276 causes the voltage to the inverting terminal of ramp-up driver 272 to change from 12 volts to 6 volts. This causes the output of ramp-up driver 272 to float so that current may flow from resistor 290 through diode 292 to charge capacitor 200. As soon as one shot 276 returns to its normal state, the output of ramp-up driver 272 becomes grounded so that current flowing through resistor 290 passes to ground, instead of through diode 292.

In this manner, capacitors 144 are periodically discharged. Each time discharge occurs, one shot 276 is actuated, causing the output of ramp-up driver 272 to float so that the charge across capacitor 200 increases.

As this process continues, eventually the output of buffer 202 becomes higher than reference value $V_{REF3}$ so that comparator 206 changes state before comparator 204. As a result, for this period, the amount of energy discharged from capacitors 144 remains at a constant plateau level. Nevertheless, the voltage across capacitor 200, as reflected by the output of operational amplifier 202, continues to increase. Eventually, this voltage becomes higher than reference voltage $V_{REF5}$ so that the output of comparator 252 becomes high. This places a voltage on the inverting input of flip-flop 258 greater than the voltage on the noninverting input so that the output of flip-flop 258 becomes low. Feedback through resistor 264 insures that the noninverting input of flip-flop 258 remains lower than the voltage at its inverting input. Therefore, the voltage of the point between resistors 268 and 270 is held at ground so that the voltage between resistors 266 and 268 is held at three volts in the preferred embodiment.

The next time comparator circuit 152 produces an output signal, and one shot 276 is triggered, the $\overline{Q}$ output of one shot 276 causes the inverting input of ramp-up driver 272 to change from 12 volts to six volts. Thus, the output of driver 272 does not change. At the same time, the Q output of one shot 276 causes the inverting input of ramp-down driver 274 to change from zero volts to six volts. As a result, the output of ramp-down driver 274 changes from floating to being grounded. Therefore, energy stored in capacitor 200 can flow through resistor 220. As a result, the voltage across capacitor 200 decreases. Thus, with each triggering of SCR 146, the voltage across capacitor 200 decreases by a fixed percentage.

Eventually, the voltage on the output of buffer 220 drops below reference voltage $V_{REF3}$ so that comparator 204 changes state before comparator 206 when the voltage across capacitors 144 reaches a sufficiently high level. Thereafter, the voltage across capacitor 144 prior to each triggering of SCR 146 gradually decreases until the cycle ends.

Figure 9:
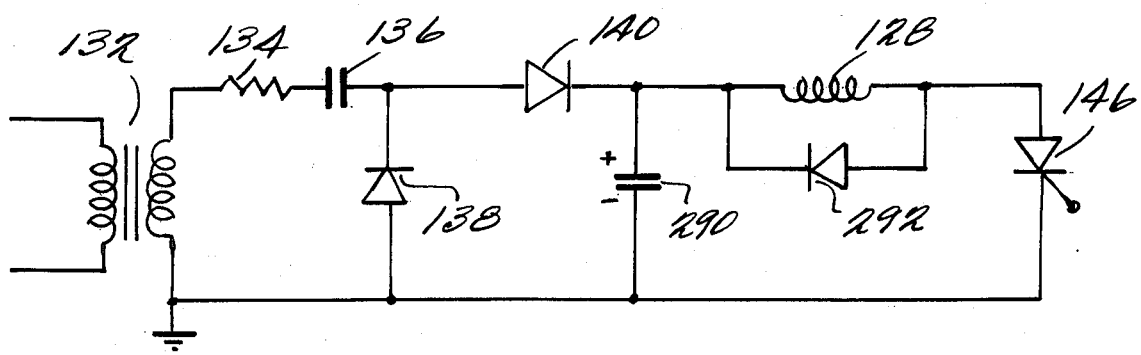
FIG. 9 is a circuit diagram of the coil energizing portion of a third embodiment of the electrical features of the present invention.

In the embodiments illustrated in FIGS. 3 and 6-8, the voltage polarity across capacitors 144 reverses. Thus, as illustrated in FIG. 5, the voltage is initially positive, then swings to a negative value before returning to a positive value. As a result, it is impossible to employ inexpensive electrolytic capacitors as capacitors 144. This possible problem is eliminated with the circuitry illustrated in FIG. 9. Note that the circuit in FIG. 9 is just the circuit for charging and discharging the main storage capacitor. Circuitry for triggering the SCR may be as in the previous Figures.

In FIG. 9, high voltage transformer 132 is again connected to a voltage doubler including resistor 134, capacitor 136 and diodes 138 and 140. Main storage capacitor 290 is connected between the cathode of diode 140 and the anode of diode 138. Thus, the voltage doubler generates a voltage which gradually charges capacitor 290. Connected in parallel with capacitor 290 is a series circuit consisting of coil 128 and SCR 146. Connected parallel to coil 128 is diode 292 which has a polarity such that diode 292 does not initially conduct when current flows through coil 128.

In operation, as soon as SCR 146 is triggered, energy flows from capacitor 290 through coil 128 and SCR 146. Eventually, the energy in capacitor 290 is depleted so that the voltage across capacitor 290 is zero. At this point, SCR 146 stops conducting. Nevertheless, energy is stored in coil 128 which causes voltage to flow from coil 128 through diode 292. This flow continues until the energy is absorbed as losses in the system.

The advantage of this arrangement, as described above, is that the voltage on capacitor 290 never reverses polarity. Therefore, capacitor 290 may be an electrolytic capacitor. The drawback is that capacitor 290 is not recharged in the last portion of a coil excitation cycle. As illustrated in FIG. 5 with respect to the embodiments illustrated in FIGS. 3 and 6-8, although the voltage across capacitor 144 becomes negative, the voltage eventually returns to a positive value as energy stored in coil 128 is reapplied to capacitor 144. Therefore, for the next degaussing cycle, it is only necessary to raise the voltage a relatively small amount. However, with the embodiment illustrated in FIG. 9, the voltage across capacitor 290 is reduced to zero. Therefore, it is necessary to charge the voltage all the way up to the desired value. This necessarily extends the time period of a degaussing cycle.

Figure 10:
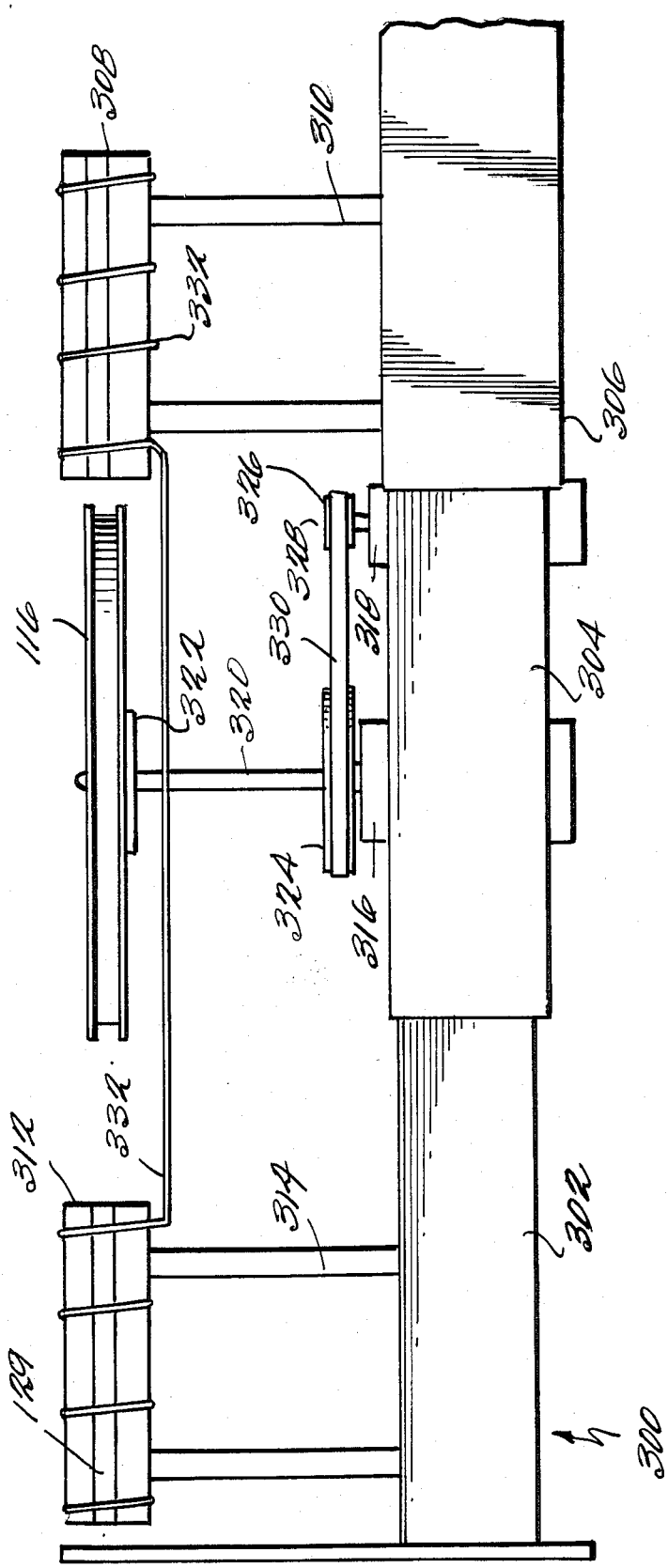
FIG. 10 is a side elevational view of another embodiment of the mechanical features of the present invention.

In the mechanical arrangement illustrated in FIGS. 1 and 2, the bottom portion of housing 126 must be deformed downwardly in order to provide for pulley 112, bracket 108 and shaft 110. This must necessarily decrease the strength of the field within the housing in relation to the current flowing through coil 128 and affect the uniformity of the field. FIG. 10 illustrates a mechanical embodiment of the present invention in which the housing may have a perfectly rectangular cross section. In FIG. 10, drawer 300 includes slide sections 302, 304 and 306. Slide portion 306 is fixed. Intermediate slide portion 304 telescopes within outer slide section 306 and inner slide section 302 telescopes within intermediate slide section 304. In this embodiment, coil housing section 308 is fixed to outer slide section 306 by means of coil supports 310. Housing portion 312 is attached to inner slide section 302 by means of coil supports 314. Bearing housing 316 and motor 318 are mounted to intermediate slide section 304. Shaft 320 is rotatably mounted in bearing housing 316. Reel support 322 forms a platform on which tape reel 116 may be positioned. Attached to shaft 320 is pulley 324. Pulley 326 is attached to shaft 328 of motor 318. Belt 330 operatively connects pulleys 324 and 326. Coil 332 is wrapped around housing sections 308 and 312.

In this embodiment, drawer 300 is pulled all the way out, separating the three slide sections. Tape reel 116 is then mounted on platform 322. As drawer 300 is closed, tape reel 116 moves within housing portion 308 and housing portion 312 encloses the other half of reel 116. When drawer 300 is pushed all the way in, tape reel 116 is completely enclosed within housing portions 308 and 312. Space must be left at the bottom of housing portions 308 and 312 to permit shaft 320 to rotate freely.

Figure 11:
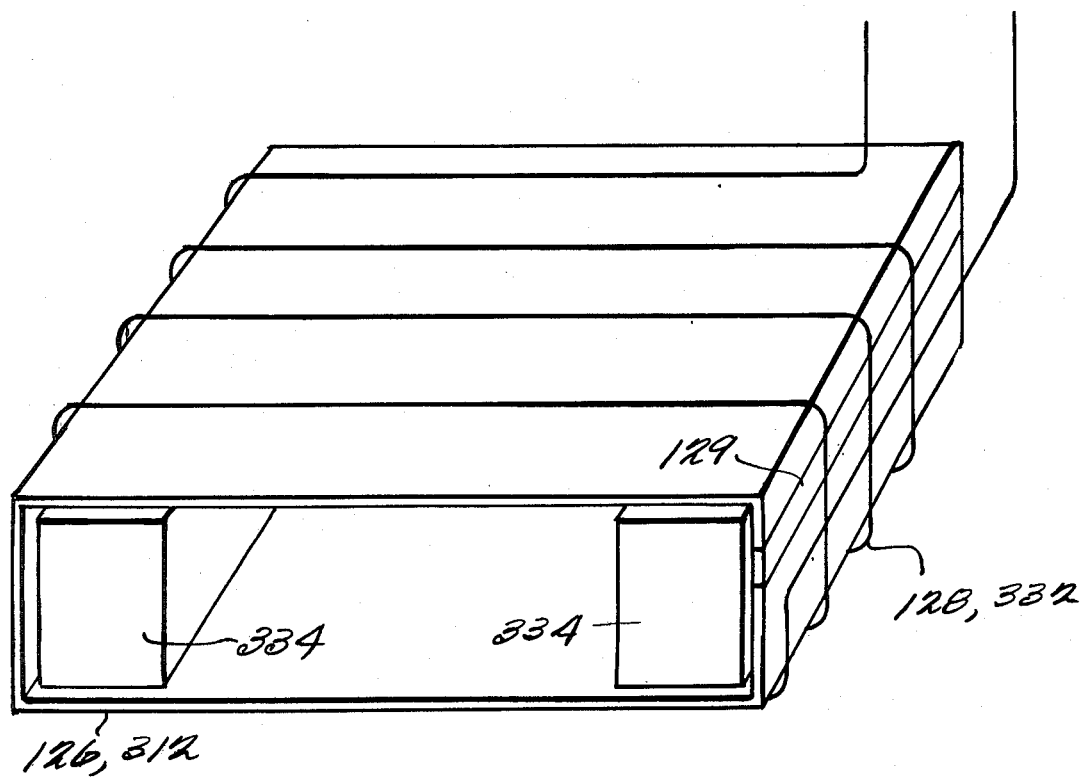
FIG. 11 is a schematic illustration illustrating the use of blocks in the degaussing coil.

Obviously, housing 126 in the first mechanical embodiment or housing portions 308 and 312 in the second mechanical embodiment must be made sufficiently large to hold the largest reel which may be desired to be degaussed. However, smaller reels may also be degaussed. In this sitution, portions within the housing may remain empty. FIG. 11 illustrates a technique for concentrating the magnetic field in the area occupied by the tape. Thus, blocks 334 may be inserted at the edges of the housing. Blocks 334 are electrically conductive and nonferromagnetic. In the preferred embodiment, they are made of aluminum. Blocks 334 help concentrate the magnetic field within that portion of the housing occupied by the tape.

Although only a few exemplary embodiments of this invention have been described in detail above, those skilled in the art will readily appreciate that many modifications are possible in the exemplary embodiments without materially departing from the novel teachings and advantages of this invention. For example, the embodiments described above employ a feedback triggering system for the SCR in which the voltage across the main storage capacitors is monitored and compared with a changing reference voltage. Instead, those skilled in the art will readily appreciate that the SCR may be triggered by a timer which produces trigger signals with increasing frequency without the use of feedback. Similarly, although the exemplary embodiments of this invention have all related to the degaussing of magnetic tape, the present invention can be employed to degauss any magnetized material.

Accordingly, all such modifications are intended to be included within the scope of this invention as defined in the following claims.

What is claimed is:

1. Apparatus for degaussing a magnetized object comprising:
   means for storing energy:
   means for gradually applying energy to said storing means;
   means for monitoring the amount of energy stored in said storing means; and
   means, responsive to said monitoring means, for repeatedly releasing energy from said storing means to said object, said releasing means reducing the energy stored in said storage means as determined by said monitoring means at the time of release with each said repeated release of energy, said releasing means including means for reversing the polarity of said energy with respect to said object over said repetitions.

2. Apparatus as in claim 1 wherein said storing means includes a capacitor.

3. Apparatus as in claim 1 wherein said releasing means includes a coil.

4. Apparatus as in claim 1 wherein said releasing means includes:
   means for generating a magnetic filed about said object; and
   said reversing means includes means for reversing the polarity of said magnetic field with each said repetition.

5. Apparatus as in claim 1 wherein said reversing means includes means for reversing the polarity of said energy by rotating said object.

6. Apparatus as in claim 1 wherein said object is magnetic recording tape.

7. Apparatus for degaussing a magnetized object comprising:
   means for storing energy;
   means for gradually applying energy to said storing means;
   a coil for surrounding said object, said coil including at least two separable sections to ease insertion and removal of said object; and
   means for repeatedly releasing energy from said storing means through said coil, said releasing means cooperating with said applying means to reduce the energy stored in said storage means at the time of release with each said repeated release of energy, said releasing means including means for reversing the polarity of said energy with respect to said object over said repetitions.

8. Apparatus as in claim 7 wherein:
   said coil defined a space; and
   said apparatus further comprises means for mounting said object within said space.

9. Apparatus as in claim 2 wherein said reversing means includes means for rotating said object.

10. Apparatus as in claim 9 wherein said rotating means includes means for increasing the rotational speed of said object.

11. Apparatus for degaussing a magnetized object comprising:
    means for storing energy;
    means for gradually applying energy to said storing means;
    a coil defining a space;
    switch means, responsive to a trigger signal and connected in a circuit with said coil and said storing means, for selectively permitting current to flow through said circuit to generate a magnetic field in said space;
    means for repeatedly generating said trigger signal to cause the amount of energy stored in said storing means at the time of current flow to decrease with each current flow so that current flowing through said coil decreases with each trigger signal for at least a portion of a degaussing cycle;
    means for mounting said object in said space; and
    means for rotating said object within said space to reverse the polarity of said magnetic field with respect to said object over said repetitions, said rotating means gradually increasing the speed of rotation of said object over said repetitions.

12. Apparatus as in claim 12 wherein said storing means includes a capacitor.

13. Apparatus as in claim 11 wherein said switching means includes a switching device for conducting current in a first direction and a diode connected in parallel with said switching device for conducting current in said second direction.

14. Apparatus as in claim 12 wherein said generating means includes:
    means for generating a control voltage that decreases during at least said portion of said degaussing cycle; and
    comparator means for producing said trigger voltage when a voltage across said storing means exceeds said control voltage.

15. Apparatus as in claim 14 further comprising electrically conductive, non-ferromagnetic blocks disposed in said space about said object.

16. Apparatus as in claim 15 wherein said blocks are made of aluminum.

17. Apparatus as in claim 11 wherein said trigger signal generating means includes means timing said trigger signals to cause the amount of current to flow to be initially greater than the degree of magnetization of said object and then gradually increase with each trigger signal before the current begins to decrease.

18. Apparatus as in claim 14 wherein said coil includes at least two separable sections.

19. Apparatus for degaussing a magnetic tape comprising:
a capacitor;
means for applying a charge to said capacitor;
a coil defining a space;
a silicon controlled rectifier connected in a circuit with said coil and said capacitor;
a diode connected in parallel with said silicon controlled rectifier so as to have a polarity opposite to said silicon controlled rectifier;
means for generating a control voltage that gradually increases and then decreases during a degaussing cycle;
comparator means for producing a trigger signal for said silicon controlled rectifier when a signal related to a voltage across said capacitor exceeds said control voltage;
means for rotatably mounting said tape in said space; and
means for rotating said tape at a speed related to the frequency of said trigger signals.

20. Apparatus as in claim 19 further comprising electrically conductive, non-ferromagnetic blocks disposed in said space around said tape.

21. Apparatus as in claim 19 wherein said blocks are made of aluminum.

22. A method for degaussing a magnetized object comprising the steps of:
gradually storing energy in an energy storage device;
monitoring the amount of energy stored in said energy storage device;
repeatedly releasing the energy from said energy storage device to said object so that the amount of energy stored in said energy storage device at the time of each of said repeated releases, as determined by said monitoring step, is reduced with each release; and
reversing the plurality of said energy with respect to said object.

23. A method as in claim 22 wherein:
said releasing step includes the step of generating a magnetic field about said object; and
said reversing step includes the step of reversing the direction of said magnetic field with each said repetition.

24. A method as in claim 22 wherein said reversing step includes the step of reversing the polarity of said energy by rotating said object.

25. A method as in claim 22 wherein:
said object is a magnetic recording tape; and
said releasing step includes the steps of repeatedly applying said energy to a coil for generating a magnetic field and disposing said tape in said coil.

26. A method as in claim 25 wherein said releasing step includes the steps of:
generating a control voltage that gradually decreases over at least said portion of a degaussing cycle; and
producing a trigger signal for initiating said magnetic field generation when a voltage across said energy storage device exceeds said control voltage.

27. A method as in claim 25 wherein said reversing step includes the step of reversing the polarity of said energy is rotating said tape.

28. A method as in claim 27 wherein said rotating step includes the step of increasing the speed of rotation during at least a portion of a degaussing cycle.

29. A method as in claim 25 further comprising the step of disposing electrically conductive, non-ferromagnetic blocks in said coil about said tape.

30. A method as in claim 25 wherein said releasing step includes the step of applying the energy at a level higher than the degree of magnetization of said object and then gradually increasing the energy applied to said object before said reduction.

31. A method for degaussing a magnetic tape comprising the steps of:
gradually applying a charge to a capacitor;
repeatedly conducting said charge on said capacitor through a coil defining a space in response to a trigger signal;
alternately reversing the direction of said magnetic field;
generating a control voltage that gradually increases and then decreases during a degaussing cycle;
producing said trigger signal when a voltage across said capacitor exceeds said control voltage;
rotatably mounting said tape in said space; and
rotating said tape at a speed related to the frequency of said trigger signals.

32. A method as in claim 31 further comprising the step of inserting electrically conductive, non-ferromagnetic blocks in said space around said tape.

33. Apparatus for degaussing a magnetized object comprising:
means for storing energy;
means for gradually applying energy to said storing means;
means for repeatedly releasing energy from said storing means to said object, said releasing means cooperating with said applying means to reduce the energy stored in said storage means at the time of release with each said repeated release of energy, said releasing means including means for reversing the polarity of said energy with respect to said object over said repetitions; and
means for reapplying energy from said object to said storing means after having been released from said storing means to said object, said reapplying means recapturing energy in said degaussing apparatus to conserve energy.

34. Apparatus for degaussing a magnetized object comprising:
means for storing energy;
means for gradually applying energy to said storing means; and
means for repeatedly releasing energy from said storing means to said object, said releasing means cooperating with said applying means to reduce the energy stored in said storage means at the time of release with each said repeated release of energy, said releasing means including means for increasing the frequency at which said releasing occurs during degaussing and means for reversing the polarity of said energy with respect to said object over said repetitions.

35. Apparatus as in claim 33 wherein said reapplying means includes a diode coupled in parallel with said releasing means and biased to allow energy to flow from said object to said storing means.

36. Apparatus for degaussing a magnetized object comprising:
   means for storing energy;
   means for gradually applying energy to said storing means;
   a coil defining a space, said object being disposed in said space;
   electrically conductive, non-ferromagnetic blocks disposed in said space about said object; and
   means for repeatedly releasing energy from said storing means to said coil, said releasing means cooperating with said applying means to reduce the energy stored in said storage means at the time of release with each said repeated release of energy, said releasing means including means for reversing the polarity of said energy with respect to said object over said repetitions.

37. Apparatus as in claim 36 wherein said blocks are made of aluminum.

38. Apparatus for deguassing a magnetized object comprising:
   means for storing energy;
   means for gradually applying energy to said storing means; and
   means for repeatedly releasing energy from said storing means to said object, said releasing means cooperating with said applying means to first gradually increae and then gradually decrease the energy stored in said storage means at the time of release with each said repeated release of energy, said releasing means including means for reversing the polarity of said energy with respect to said object over said repetitions.

39. A method of degaussing a magnetized object comprising the steps of:
   gradually storing energy in an energy storage device;
   repeatedly releasing the energy from said energy storing device to said object so that the amount of energy stored in said energy storage device at the time of each of said repeated releases is reduced with each release;
   reversing the polarity of said energy with respect to said object; and
   reapplying energy to said energy storage device from said object after said energy has been released from said energy storage device to said object.

40. A method of deguassing a magnetized object comprising the steps of:
   gradually storing energy in an energy storage device;
   repeatedly releasing the energy from said energy storage device to said object so that the amount of energy stored in said energy storage device at the time of each of said repeated releases is reduced with each release; and
   rotating said object to reverse the polarity of said energy with respect to said object, said rotating step including the step of increasing the rotational speed of said object during degaussing.

41. A method of degaussing a magnetized object comprising the steps of:
   gradually storing energy in an energy storage device;
   repeatedly releasing the energy from said energy storing device to said object so that the amount of energy stored in said energy storage device at the time of each of said repeated releases is reduced with each release, the frequency of said repeated releases increasing during degaussing; and
   reversing the polarity of said energy with respect to said object.

42. A method for deguassing a magnetized object comprising the steps of:
   gradually storing energy in an energy storage device;
   repeatedly releasing the energy from said energy storage device to said object so that the amount of energy stored in said energy storage device at the time of each of said repeated releases first increases and then decreases with each release; and
   reversing the polarity of said energy with respect to said object.

* * * * *